United States Patent
Lv et al.

(10) Patent No.: US 9,004,738 B2
(45) Date of Patent: Apr. 14, 2015

(54) DISPLAY DEVICE

(71) Applicant: Shenzhen China Star Optoelectronics Technology Co., Ltd., Shenzhen, Guangdong (CN)

(72) Inventors: Chengling Lv, Shenzhen (CN); Yuchun Hsiao, Shenzhen (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 244 days.

(21) Appl. No.: 13/702,070

(22) PCT Filed: Nov. 23, 2012

(86) PCT No.: PCT/CN2012/085100
§ 371 (c)(1),
(2) Date: Dec. 4, 2012

(87) PCT Pub. No.: WO2014/075332
PCT Pub. Date: May 22, 2014

(65) Prior Publication Data
US 2014/0140100 A1    May 22, 2014

(30) Foreign Application Priority Data
Nov. 16, 2012  (CN) .......................... 2012 1 0464973

(51) Int. Cl.
*F21V 8/00*    (2006.01)

(52) U.S. Cl.
CPC .................................... *G02B 6/0088* (2013.01)

(58) Field of Classification Search
None
See application file for complete search history.

(56) References Cited

U.S. PATENT DOCUMENTS

| 7,431,475 B2 * | 10/2008 | Hafuka et al. ................. 362/218 |
| 2012/0140448 A1 * | 6/2012 | Nagayoshi et al. ........... 362/97.3 |
| 2012/0224394 A1 * | 9/2012 | Zhang ............................ 362/632 |
| 2013/0278611 A1 * | 10/2013 | Holman ........................ 345/501 |

* cited by examiner

*Primary Examiner* — Ashok Patel
(74) *Attorney, Agent, or Firm* — Andrew C. Cheng

(57) ABSTRACT

The present invention provides a display device comprising: back plate, lightguiding plate, optical film, and positioning unit. Lightguiding plate is disposed on back plate. Optical film is disposed on lightguiding plate. Optical film comprises at least one positioning section. Positioning section comprises first extending section extending out from the margin of optical film, and second extending section being connected with extending section. Positioning unit is disposed close to optical film and fixed on back plate. Positioning unit comprises main section and hold down section connecting to main section. The present invention, adding positioning unit comprising a groove holding first extending section and hold down section holding down second extending section on back plate, makes optical film positioned and prevents disposition and falloff during the manufacturing and transportation process. In addition, without applying tapes to position optical film, as a result, optical film waving is prevented.

15 Claims, 8 Drawing Sheets

DISPLAY DEVICE

BACKGROUND OF THE INVENTION

1. Field of the Invention

The present invention relates to the field of displaying techniques, and in particular to display device.

2. The Related Arts

The display device of known technique usually comprises front frame, middle frame, display panel and backlight module, and the backlight module comprises reflector, lightguiding plate, and optical film disposed on back plate.

In known technique, optical film is disposed on lightguiding plate. In order to prevent disposition and falloff of optical film, a method as shown in FIG. 1 is usually used to position optical film. Convex bump 111 is disposed on middle frame 110 surrounding display panel, and recessed hole 121 corresponding to convex bump 111 is disposed on the margin of optical film 120. Optical film 120 is positioned by positioning convex bump 111 in recessed hole 121 and applying tape 130.

As a result, while display device is during the high thermal test, thermal expansion and contraction of tape 130 caused by changing of temperature produces the stress which results in the waving of optical film. Furthermore, the quality of optical performance compromised; thus, the quality of displaying performance compromised.

Therefore, a display device is provided to solve the problems.

SUMMARY OF THE INVENTION

The technical issue to be addressed by the present invention is to provide a display device without applying tapes to position optical film; as a result, to avoid optical film falloff and waving.

The present invention provides a display device, which comprises: a back plate; a lightguiding plate being disposed on the back plate; an optical film being disposed on the lightguiding plate; the optical film comprising at least one positioning section; the positioning section comprising a first extending section, which extending out from the margin of optical film, and a second extending section, which being connected with the extending section; a positioning unit being disposed closed to the optical film and fixed on the back plate; the positioning unit comprising a main section and a hold down section connecting to the main section; a groove of the first extending section being disposed on the main section; the hold down section holding down the second extending section on the back plate; wherein, the hold down section being disposed vertically to the main section; the hold down section comprising a bottom side toward to the back side of the back plate and a top side away from the back side of the back plate; the bottom side holding down the second extending section; the top side supporting the display panel of the display device; the width of the groove being identical or close to the width of the first extending section; the length of the groove being identical or close to the extending length of the first extending section; the length between the hold down section and the back plate being identical or close to the thickness of the second extending section.

According to a preferred embodiment of the present invention, hooks are disposed on the side of the main section close to the back plate; the positioning holes corresponding to the hooks are disposed on the back plate; hooks are held by the positioning holes to fix the positioning unit.

According to a preferred embodiment of the present invention, the positioning unit is attached to the back plate.

According to a preferred embodiment of the present invention, the first extending section is strip-shaped and the second extending section is triangle-shaped.

According to a preferred embodiment of the present invention, the second extending section and the first extending section are disposed vertically to make the positioning section T-shaped.

The present invention provides a display device, which comprises: a back plate; a lightguiding plate being disposed on the back plate; an optical film being disposed on the lightguiding plate; the optical film comprising at least one positioning section; the positioning section comprising a first extending section, which extending out from the margin of optical film, and a second extending section, which being connected with the extending section; a positioning unit being disposed closed to the optical film and fixed on the back plate; the positioning unit comprising a main section and a hold down section connecting to the main section; a groove of the first extending section being disposed on the main section; the hold down section holding down the second extending section on the back plate.

According to a preferred embodiment of the present invention, the positioning unit is made of silicon dioxide; the hold down section and the main section are integrally formed.

According to a preferred embodiment of the present invention, hooks are disposed on the side of the main section close to the back plate; the positioning holes corresponding to the hooks are disposed on the back plate; hooks are held by the positioning holes to fix the positioning unit.

According to a preferred embodiment of the present invention, the positioning unit is attached to the back plate.

According to a preferred embodiment of the present invention, the hold down section is disposed vertically to the main section; the hold down section comprises a bottom side toward to the back side of the back plate and a top side away from the back side of the back plate; the bottom side holds down the second extending section; the top side supports the display panel of the display device.

According to a preferred embodiment of the present invention, blocking section is disposed on the top side of hold down section to position the display panel; the blocking section is disposed along with the display panel.

According to a preferred embodiment of the present invention, the width of the groove is identical or close to the width of the first extending section; the length of the groove is identical or close to the extending length of the first extending section.

According to a preferred embodiment of the present invention, the length between the hold down section and the back plate is identical or close to the thickness of the second extending section.

According to a preferred embodiment of the present invention, the first extending section is strip-shaped and the second extending section is triangle-shaped.

According to a preferred embodiment of the present invention, the second extending section and the first extending section are disposed vertically to make the positioning section T-shaped.

The efficacy of the present invention is that to be distinguished from the state of the art. The present invention, through adding a positioning unit comprising a groove which holds a first extending section of optical film, and a hold down section holding down a second extending section of optical film on a back plate, makes optical film positioned and prevents the disposition and falloff of optical film during the manufacturing and transportation process. In addition, without applying tapes to position optical film, as a result, optical film waving is prevented. Furthermore, the present invention can make optical film positioning, as well as support and position display panel in a backlight module with no middle frame or a rectangle middle frame.

DETAILED DESCRIPTION OF THE PREFERRED EMBODIMENTS

The following combines drawings and embodiments to describe the present invention in details.

Figure 2:
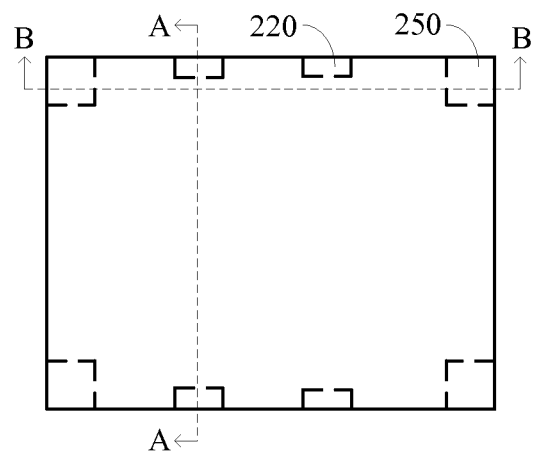
FIG. 2 is a schematic view showing the structure of an embodiment of the display device according to the present invention.
Figure 3:
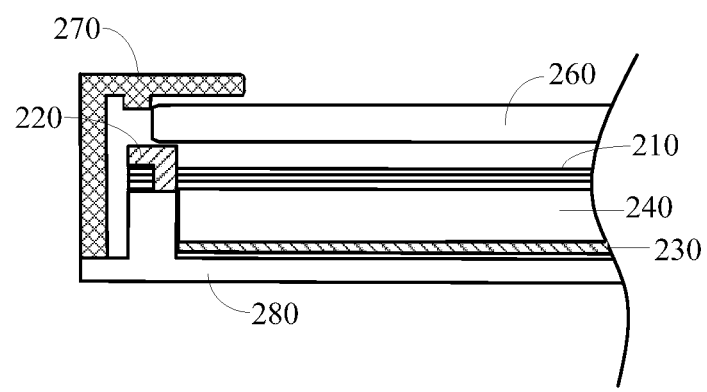
FIG. 3 is a cross-sectional view showing the section A-A in FIG. 2.

Referring to FIG. 2 and FIG. 3, FIG. 2 is a schematic view showing the structure of the display device according to the present invention. FIG. 3 is a cross-sectional view showing the cross-section A-A in FIG. 2. As shown in FIG. 2 and FIG. 3, display device 200 at least comprises: optical film 210 and positioning unit 220.

Figure 1:
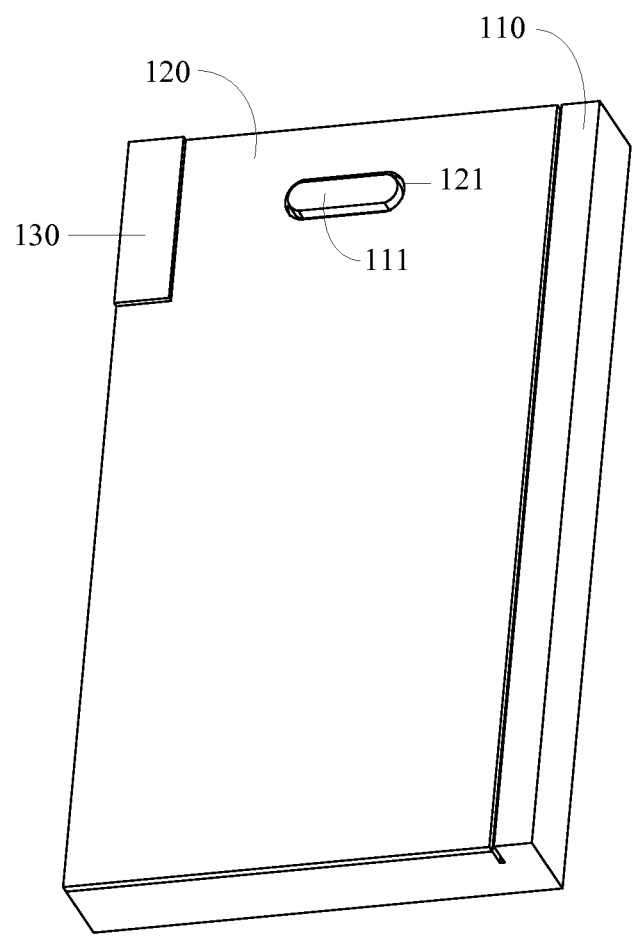
FIG. 1 is a schematic view showing the structure of optical film positioning in known technique.

In the instant embodiment, display device 200, as an example: a edge-lit display device, comprises: reflector 230, lightguiding plate 240, middle frame 250, and display panel 260. Reflector 230, lightguiding plate 240, middle frame 250, and display panel 260 are disposed in order. According to a preferred embodiment of the present invention, as shown in FIG. 1, middle frame 250 is disposed on the four corners of display panel 260. Middle frame 250, front frame 270, and back plate 280 fix firmly the display panel 260, lightguiding plate 240, and optical film 210 on back plate 280.

Positioning unit 220 is disposed closed to the optical film and fixed on the back plate. According to a preferred embodiment of the present invention, positioning unit 220 is made of silicon dioxide, or other proper elastic materials which meet the needs of the design.

Figure 4:
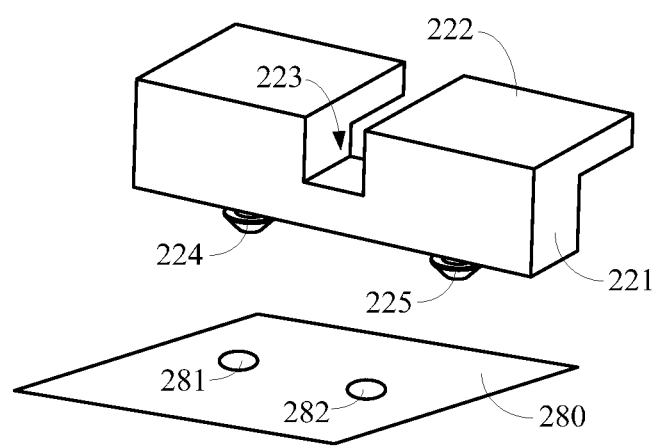
FIG. 4 is a schematic view showing the positioning unit in FIG. 3.

FIG. 4 is a schematic view showing positioning unit 220 in FIG. 3. As shown in FIG. 4, positioning unit 220 comprises: main section 221 and hold down section 222.

According to a preferred embodiment of the present invention, groove 223, hold down 222 are disposed on main section 221 and integrally formed with main section 221.

Figure 5:
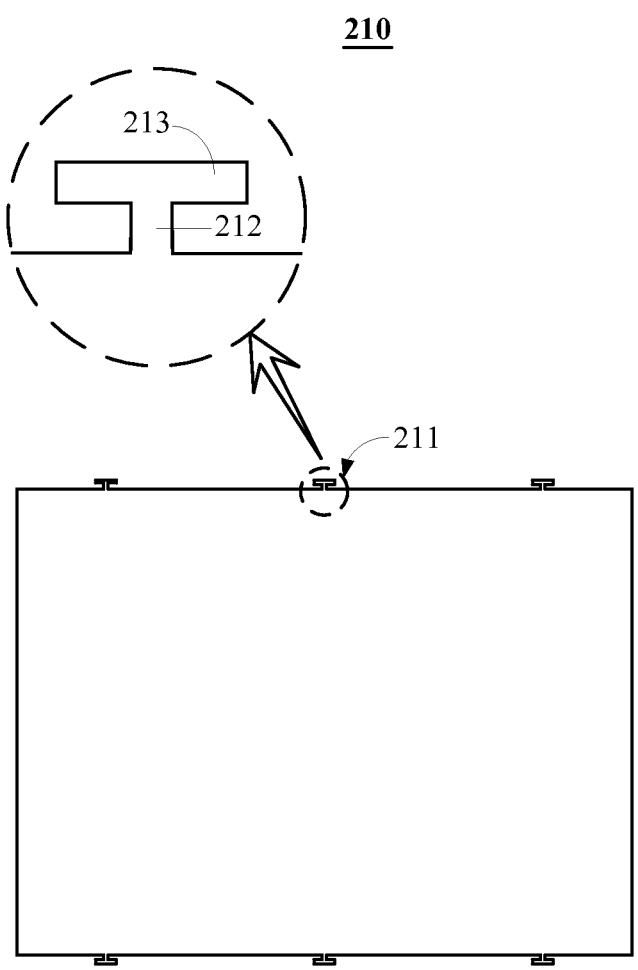
FIG. 5 is a schematic view showing the structure of an embodiment of the optical film in FIG. 3.

As aforementioned, optical film 210 is disposed to correspond with positioning unit 220. FIG. 5 is a schematic view showing the structure of an embodiment of the optical film 210, As shown in FIG. 5, optical film 210 comprises at least one positioning section 211; every positioning section 211 comprises: first extending section 212 and second extending section 213. It should be noted that positioning section 211 and positioning unit 220 are located outside of the area of lightguiding plate 240.

Figure 6:
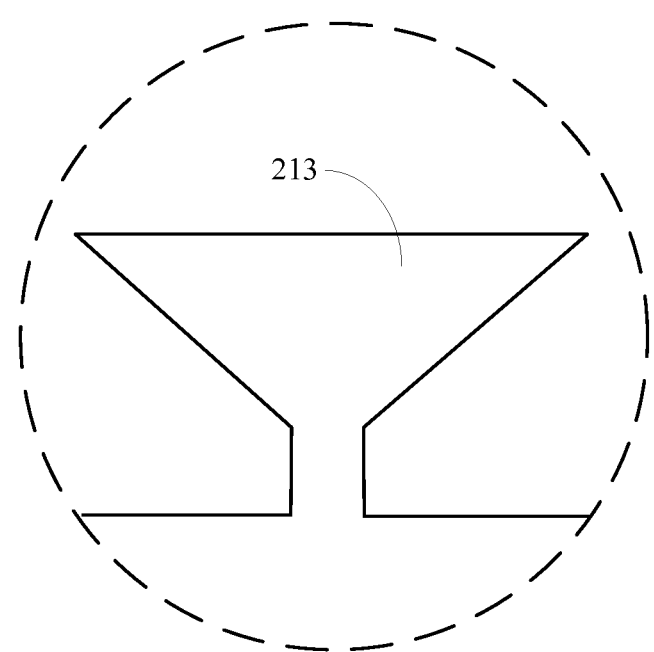
FIG. 6 is another schematic view showing the structure of an embodiment of the optical film according to the present invention.

According to a preferred embodiment of the present invention, first extending section 212 extends out from the margin of optical film 210 and is strip-shaped. Second extending section 213 and first extending section 212 are disposed vertically to make positioning section 211 T-shaped. In another embodiment, second extending section 213 can be triangle-shaped, as shown in FIG. 6, or other shapes, as long as second extending section 213 corresponds to positioning section 211 and positioning unit 220 to position optical film 210.

Figure 7:
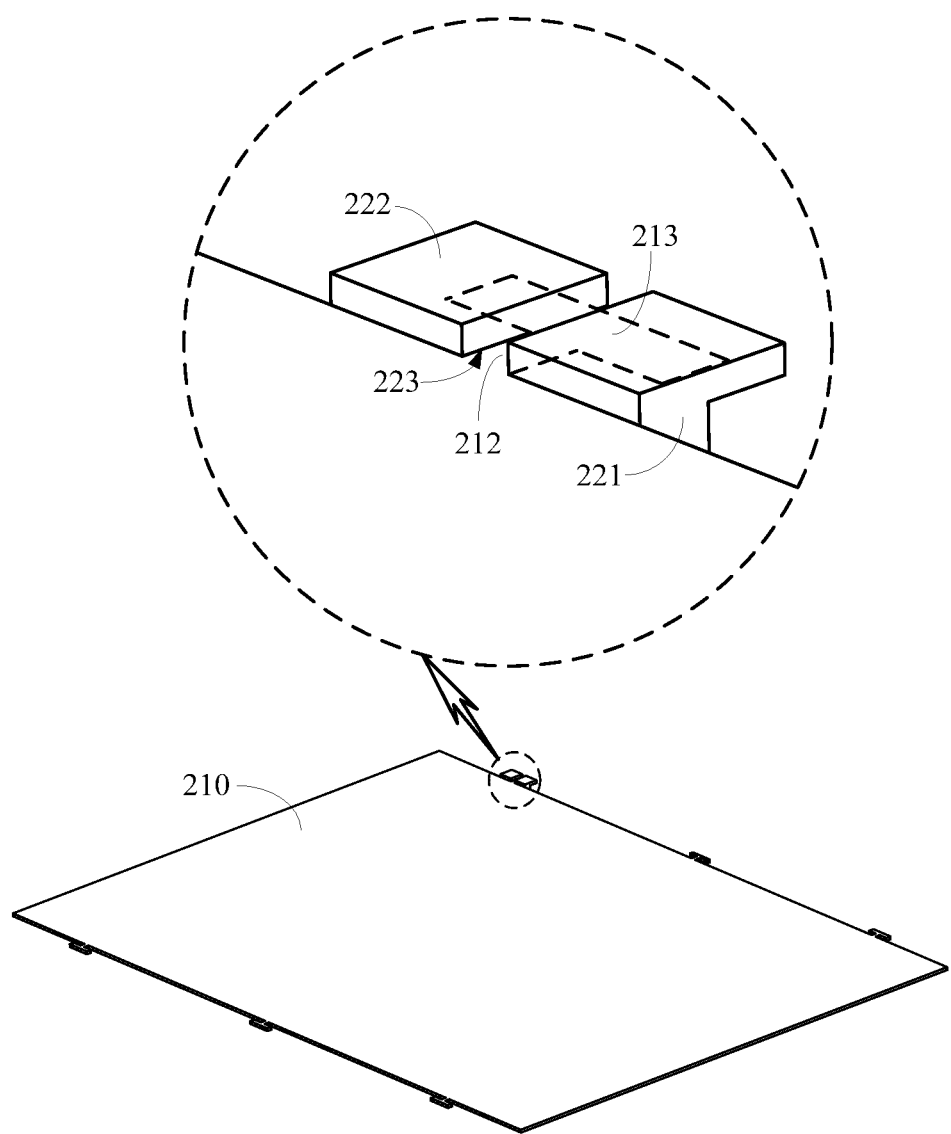
FIG. 7 is a schematic view showing the positioning unit and optical film in FIG. 4.

FIG. 7 is a schematic view showing positioning unit 220 and optical film 210. As shown in FIG. 4, FIG. 5, and FIG. 7, first extending section 212 is held in groove 223, and hold down section 222 holds down second extending section 213 on back plate 280. In order to ensure the optimal performance of optical film 210 positioning, it should be noted that: the width of groove 223 is identical or close to the width of first extending section 212; the length of groove 223 is identical or close to the extending length of first extending section 212; the length between hold down section 222 and back plate 280 is identical or close to the thickness of optical film 210. It means that: if display devise 200 comprises single-layered optical film 210, the length between hold down section 222 and back plate 280 is identical or close to the thickness of second extending section 213; if display devise 200 comprises multiple-layered optical film 210, the length between hold down section 222 and back plate 280 is identical or close to the thickness of optical film 210.

In the instant embodiment, in order to position optical film 210, position unit 220 fixes back plate 280. As shown in FIG. 4, first hook 224 and second hook 225 are disposed on main section 221 of position unit 220 and a side of back plate 280. First position hole 281 corresponding to first hook 224 and second position hole 282 corresponding to second hook 225 are disposed on back plate 280. Through holding first hook 224 within first position hole 281 and second hook 225 within second position hole 282, position unit 220 fixes back plate 280. In another embodiment, through attaching, position unit 220 fixes back plate 280.

In the instant embodiment, first extending section 212 of optical film 210 is held in groove 223 of positioning unit 220, and hold down section 222 of positioning unit 220 holds down second extending section 213 of optical film 210 on back plate 280. It ensures that optical film 210 is positioned and prevents the disposition and falloff of optical film 210 during the manufacturing and transportation process. In addition, the stress effect produced by thermal expansion and contraction of optical film 210 caused by changing of temperature during the high thermal test can be released to prevent optical film 210 waving. Furthermore, as shown in FIG. 3, hold down section 222 is disposed vertically to main section 221 and comprises a bottom side toward to the back side of back plate 280 and a top side away from the back side of back plate 280, as a result, the bottom side holds down second extending section 213, and the top side supports display panel 260 of display device 200.

It should be noted that even though it is described that device 200 is an edge-lit display device as an example, positioning unit 220 of the present invention is not only for liquid crystal display devices, but also for other optical-film-type display devices.

Figure 8:
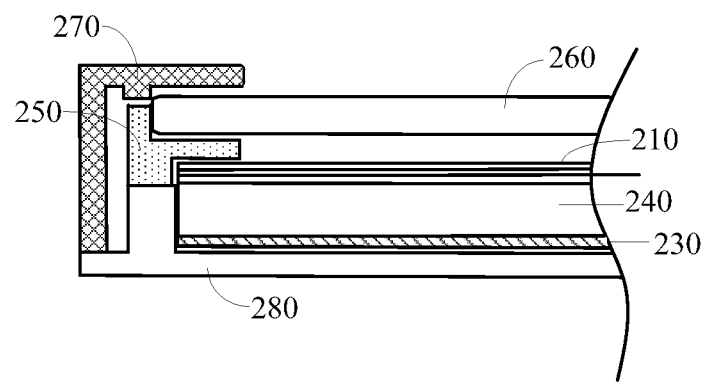
FIG. 8 is a cross-sectional view showing the section B-B in FIG. 2.
Figure 9:
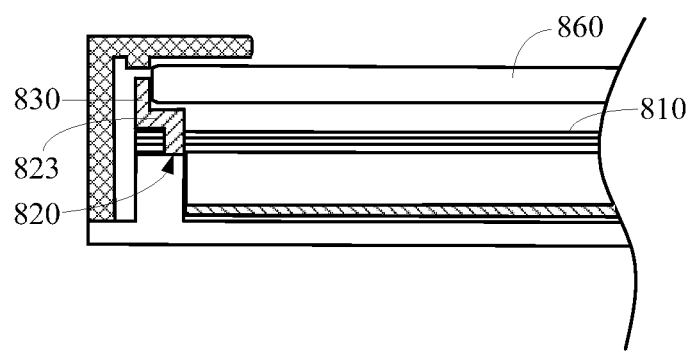
FIG. 9 is another schematic view showing the structure of an embodiment of the display device according to the present invention.
Figure 10:
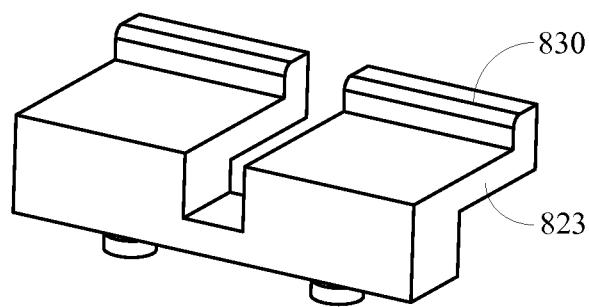
FIG. 10 is a schematic view showing the positioning unit in FIG. 9.
Figure 11:
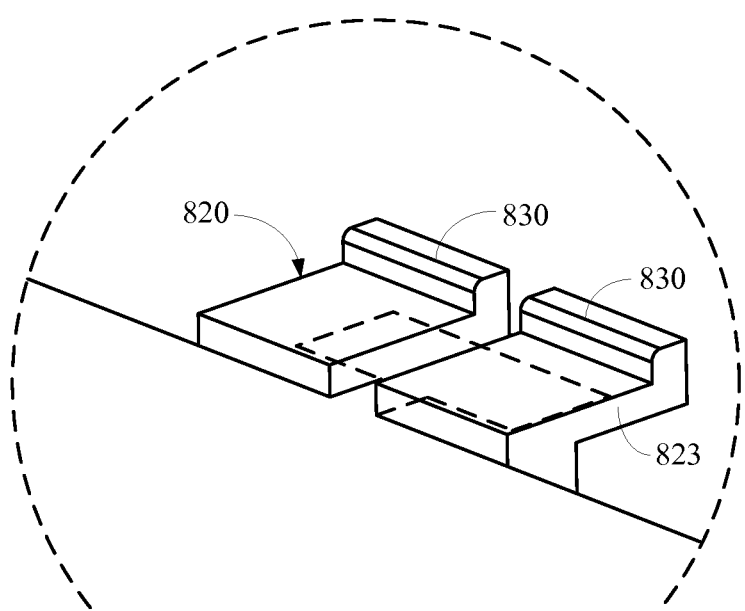
FIG. 11 a schematic view showing the positioning unit and optical film in FIG. 10.

FIG. 8 is a cross-sectional view showing the cross-section B-B in FIG. 2. As shown in FIG. 8, middle frame 250 is used to support and position display panel 260. In order to reduce the materials and the cost, display devices without middle frames are common. Therefore, in another embodiment, position units can be used instead of middle frames. For example:

FIG. 9 is another schematic view showing the structure of an embodiment of the display device according to the present invention. FIG. 10 is a schematic view showing the positioning unit in FIG. 9. FIG. 11 a schematic view showing the positioning unit and optical film in FIG. 10. As shown in FIG. 9, FIG. 10, and FIG. 11, be different from the previous embodiment, in the instant embodiment, blocking section 830 is disposed on the top side of hold down section 823 of positioning unit 820.

According to a preferred embodiment of the present invention, blocking section 830 is disposed along with display panel 860 to position display panel 860. Position unit 820 of the instant embodiment can not only be used to position and support display panel 860 and position optical film 810 in display devices without middle frames, but also in display devices with middle rectangle frames.

In addition, one skilled in the art will appreciate that the number and location of blocking section 830 can be practiced by other than the disclosed embodiments, all of which are presented in this description for purposes of figures and not of limitation.

As aforementioned, the efficacy of the present invention is that to be distinguished from the state of the art. The present invention, through adding a positioning unit comprising a groove which holds a first extending section of optical film, and a hold down section holding down a second extending section of optical film on a back plate, makes optical film positioned and prevents the disposition and falloff of optical film during the manufacturing and transportation process. In addition, without applying tapes to position optical film, as a result, optical film waving is prevented. Furthermore, the present invention can make optical film positioning, as well as support and position display panel in a backlight module with no middle frame or a rectangle middle frame.

In another instant embodiment, one skilled in the art will appreciate that positioning units of the present invention can be practiced by other than the disclosed embodiments, as long as the position units fix the back plate and holds down the optical films on the plate, all of which are presented in this description for purposes of FIG. 1 to FIG. 7 and not of limitation.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. A display device, which comprises:
   a back plate;
   a lightguiding plate disposed on the back plate;
   an optical film disposed on the lightguiding plate;
   the optical film comprising at least one positioning section;
   the positioning section comprising a first extending section extending out from a margin of the optical film, and a second extending section connected with the first extending section;
   a positioning unit being disposed closed to the optical film and fixed on the back plate;
   the positioning unit comprising a main section and a hold down section connected to the main section;
   a groove of the first extending section being disposed on the main section;
   the hold down section holding down the second extending section on the back plate
   and the hold down section being disposed vertically to the main section;
   the hold down section comprising a bottom side toward to a back side of the back plate and a top side away from the back side of the back plate;
   the bottom side holding down the second extending section; the top side supporting the display panel of the display device; the width of the groove being identical or close to the width of the first extending section;
   the length of the groove being identical or close to the extending length of the first extending section; and
   the length between the hold down section and the back plate being identical or close to the thickness of the second extending section.

2. The display device as claimed in claim 1, wherein a plurality of hooks are disposed on a side of the main section close to the back plate; a plurality of positioning holes are disposed on the back plate corresponding to the hooks; and the plurality of hooks are held by the positioning holes to fix the positioning unit.

3. The display device as claimed in claim 1, wherein the positioning unit is attached to the back plate.

4. The display device as claimed in claim 1, wherein the first extending section is strip-shaped and the second extending section is triangle-shaped.

5. The display device as claimed in claim 1, wherein the second extending section and the first extending section are disposed vertically to make the positioning section T-shaped.

6. A display device, which comprises:
   a back plate;
   a lightguiding plate disposed on the back plate;
   an optical film disposed on the lightguiding plate;
   the optical film comprising at least one positioning section;
   the positioning section comprising a first extending section extending out from the margin of optical film, and a second extending section being connected with the first extending section;
   a positioning unit being disposed closed to the optical film and fixed on the back plate;
   the positioning unit comprising a main section and a hold down section connected to the main section;
   a groove of the first extending section being disposed on the main section; and
   the hold down section holding down the second extending section on the back plate.

7. The display device as claimed in claim 6, wherein the positioning unit is made of silicon dioxide; and the hold down section and the main section are integrally formed.

8. The display device as claimed in claim 6, wherein a plurality of hooks are disposed on the side of the main section close to the back plate; a plurality of positioning holes are disposed on the back plate corresponding to the plurality of hooks; and the plurality of hooks are held by the plurality of positioning holes to fix the positioning unit.

9. The display device as claimed in claim 6, wherein the positioning unit is attached to the back plate.

10. The display device as claimed in claim 6, wherein the hold down section is disposed vertically to the main section;
    the hold down section comprises a bottom side toward to a back side of the back plate and a top side away from the back side of the back plate; and the bottom side holds down the second extending section;
the top side supports a display panel of the display device.

11. The display device as claimed in claim 10, wherein a blocking section is disposed on the top side of hold down section to position the display panel; and
the blocking section is disposed along with the display panel.

12. The display device as claimed in claim 6, wherein the width of the groove is identical or close to the width of the first extending section; and the length of the groove being identical or close to the extending length of the first extending section.

13. The display device as claimed in claim 12, wherein the length between the hold down section and the back plate is identical or close to the thickness of the second extending section.

14. The display device as claimed in claim 6, wherein the first extending section is strip-shaped and the second extending section is triangle-shaped.

15. The display device as claimed in claim 6, wherein the second extending section and the first extending section are disposed vertically to make the positioning section T-shaped.

* * * * *